Nov. 29, 1966 C. FETE 3,288,401
AIRCRAFT RUDDER LOCK STRUCTURE
Filed Aug. 27, 1965
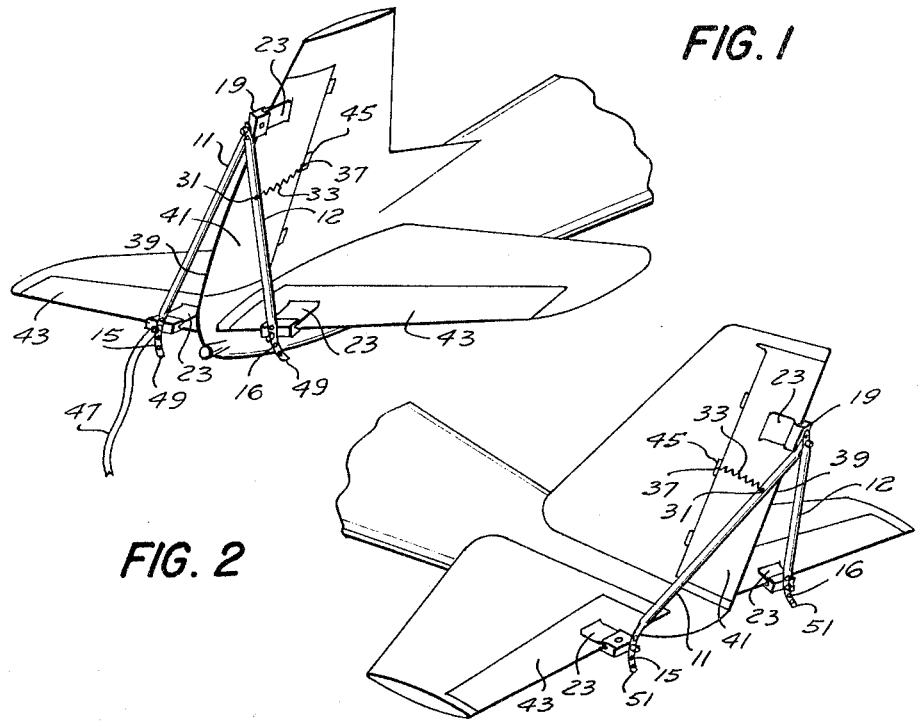
INVENTOR
CHARLES FETE
BY
Kane, Dalsimer, Kane & Smith
ATTORNEYS

United States Patent Office 3,288,401
Patented Nov. 29, 1966

3,288,401
AIRCRAFT RUDDER LOCK STRUCTURE
Charles Fete, Santa Ana, Calif., assignor to The Reedy Corporation, Costa Mesa, Calif., a corporation of California
Filed Aug. 27, 1965, Ser. No. 483,117
14 Claims. (Cl. 244—83)

This invention relates to a locking device for holding the rudder structure of an aircraft substantially immobile during periods of aircraft grounding.

When light aircraft are parked at airports and not confined within a hangar, the entire structure and controls is frequently subjected to the effects of high winds, as well as jet and propeller blasts from neighboring aircraft. Particularly in cases where these blasts are directed against the rudder components, much serious damage frequently results. The wind effects are particularly hard for the rudder to withstand due to its relatively large area. The damage is often serious not only from a safety standpoint, but also as far as the effect on the overall maintenance operation is concerned. If the damage occurs in remote areas, great inconvenience and often extra expense is experienced by the aircraft operator. Loss of time and the expense of mechanics not familiar with the particular aircraft are particularly evident in making repairs at such times.

This invention is directed to an apparatus of a type by which the damaging effects above noted are substantially avoided. While the invention is usable particularly with light aircraft, it is by no means restricted thereto. It provides a simple and convenient means whereby the rudder structure, as well as the elevator structures (often termed "horizontal rudders") may be held substantially immobile during grounding periods. The immobilizing or locking structure is extremely simple and easily installed. Nevertheless, it is a type of structure which may be easily removed from the aircraft prior to flight, with the result that no damage to either the rudder or elevator structures can occur.

The aircraft structure elements which are to be secured are usually formed of thin aluminum parts which are light and yet sufficiently strong to insure safety in flight. They are, however, susceptible to damage when grounded and subjected to high stresses. By this invention, the locking structure framework is formed of a plurality of lightweight, high-strength leg elements. The elements, when installed and used with the aircraft, are arranged to assume a generally inverted "V-structure" and to fold into a substantially "I-structure" when removed from the aircraft. Each leg element is preferably flattened at each end. One flattened end of each leg element is curved to insure ease of positioning relative to the elements of the aircraft structure which are to be secured. The other flattened end extends either substantially in alignment with or parallel to the axis of the element. Suitable spring clamps or clips are attached to each flattened end of the leg elements and are adapted to be clamped to the aircraft rudder and elevator components and to be held by the leg elements.

The spring clamps are normally made from tempered steel. Each clamp usually carries a soft bearing or cushioning surface so that when assembled with the aircraft for holding the selected elements fixed, the attachment can be made without damaging the aircraft structure proper. The spring clamp element which joins the straight flattened end of the leg element is adapted to be attached to the trailing edge of the rudder structure at a selected point between its top and bottom. The spring clamp which is attached to each flattened curved end of the leg element is adapted to be secured to the trailing edge of the elevator or horizontal rudder elements at either side of the rudder.

The type of fastenings of the entire component is determined to some extent by the tightness with which the spring clamps are fastened. The securement, however, is improved by attaching one end of an expansible spring member to at least one of the leg elements at a point between its ends. The opposite end of the spring is then secured to a suitable point on the aircraft structure itself. The securement point may be chosen at random but usually is made at some appropriate point on the empennage of the aircraft in the vicinity of the rudder and ahead of it. It can readily be made to the fin about which the rudder is pivoted and adapted to turn. The spring element is sufficiently tight and rigid to hold the entire assembly securely to the aircraft to prevent any rudder or elevator movement during periods of its attachment. In order that the operator or pilot may not accidentally endeavor to fly the aircraft without having first removed the locking system, it is usually desirable to attach a warning streamer to one or both of the leg elements. Such a streamer serves to call attention of either ground crews or the pilot himself to the fact that the locking system is in place.

With the foregoing background it will be apparent that the main objective of the invention is to provide a removable locking device by which the aircraft can be protected against damage by wind when grounded. Other objectives are those of providing an efficient, inexpensive, easily installed locking device of light weight which in non-use periods may readily be removed to be transported even in assembled form with the plane.

The invention is illustrated in its preferred form by the accompanying drawings wherein: FIG. 1 is substantially a side view of the rudder locking unit attached to an aircraft; FIG. 2 is substantially an end view showing particularly the attachment of the components to each of the rudder and elevator structures; FIG. 3 is an exploded view with the components disassembled, but generally in a position of assembly to exemplify the simplicity of the structure as a whole; and FIG. 4 is a modification of the structure of the leg elements for holding the clamps.

Reference may now be made to the drawing for a thorough and more complete understanding of the invention in its preferred forms. The locking unit comprises a pair of leg elements 11 and 12. These legs are preferably of lightweight metal. They are usually tubular, although any structural form may be used as an alternative. For ease of attachment, the leg elements are flattened at each end. Flattened portions 13 and 14 extend from one end of the legs in approximately the direction of the axis of the leg elements or parallel thereto. The opposite end of the legs are curved and flattened, as indicated at 15 and 16, to assume an arcuate path of limited length. The radius of curvature and the angle of arc may be varied within reasonable limits for a type of structure generally universal in nature so as to be used with most small aircraft. It has been found that satisfactory results are achieved with a structure adaptable to many aircraft types when the flattened end is curved over an arc of between 28° and 34° when described on a radius of curvature of about 4¼″ to 4½″, with an arc of about 31° being preferred in many cases.

The straight flattened ends 13 and 14, as well as the curved ends 15 and 16, preferably have one or more aligned openings formed therethrough. For attachment to the aircraft structure a spring clamp of the type generally but schematically designated at 19 is secured by an appropriate fastening bolt to each of the curved ends 15 and 16 (see particularly FIG. 2). This attachment is made by way of connection of the clamps through the flattened end through the fastening bolt 21 extending outwardly from the spring clamp holder. The forward end 23 consists of a pair of gripping jaws which tend to close under the force of a spring element (not shown) which is part of the clamp and secured by the spindle 25 element to the leg structure. The clamp, in one of its preferred forms, is opened by applying pressure at its outer end 27. Then, when the inner edge of the clamp is placed in position to straddle the surface to be gripped, the jaws 23 are forced apart against the closing force of an internal flat spring member (not shown). The spread jaws then overlap and straddle the gripped surface, which may be either the rudder or the elevator of the aircraft. The clamp is removed by simply withdrawing it under a manual pull. The clamp is preferably formed to swivel to some limited extent to give greater freedom of attachment. Also, for ease of attachment, the locking bolt 21 is frequently mounted eccentrically as indicated by the drawings although other arrangements may be used.

A similar clamp is arranged to be positioned and held adjacent to the uncurved flattened ends 13 and 14 of the leg elements. This securement is established by a bolt or pin extending through one of the openings, 28 or 29, with the lug 21 of the clamp 19 held therebetween.

In supporting the clamps in the openings in the ends of the curved sections 15 and 16 and between the flattened ends 13 and 14, it is usually customary to provide suitable spacers or washers (such as those formed of "Nylon") to act as bearing surfaces for the assembly. The tightening of the clips to the flattened ends through the "Nylon" spacers or washers establishes the ease of swivel to be permitted.

Between the flattened ends of each of the leg elements 11 and 12 it is customary to secure a fastening pin 31. The fastening pin serves as an anchor point in which one end 33 of an expansible spring 35 may be attached. The opposite end 37, as will be explained later, is secured to a selected point in the empennage of the aircraft or to the pin from which the rudder structure is pivoted.

Reference is now made to FIG. 2 of the drawings. It can be seen that the clamp 19, which is pivotally attached to the flattened ends 13 and 14, is also fastened over the trailing edge 39 of the vertical rudder 41. The separate cushioning component can be placed between the clip and the rudder where desired although this is usually not necessary where the clip is provided with a padded inner surface for the member 23.

While only one side of the fastener is depicted in detail by FIG. 2, the curved end 16 is shown attached to clip 19 which in turn is fastened to the trailing edge of the elevator 43. The attachment is made at a point outwardly removed from the rudder 41. The structure is duplicated on each side of the rudder. By attaching the leg elements to the clamp members, a three-point suspension is established. Generally speaking, this is normally sufficiently tight to protect against motion conditions. Where further security is desirable and it is not desired to apply additional pressure on the structural components of the aircraft, the assembly is held to the aircraft by the spring element 35 so end 33 attaches to the pin 31 on the leg element 11 (or 12). The opposite end 37 of the spring is then attached to a selected point 45 on the empennage. This insures tightening of the two legs by providing a force component inwardly of the trailing edge of each of the rudder and the elevators sufficient to hold the clamps more securely in position. When the unit is installed on the aircraft, as shown by FIGS. 2 and 3, a streamer 47 is normally attached to one of the leg elements 11 or 12 and permitted to hang freely.

In the assembled state the leg elements and other attachments form into an open inverted V. When the structure is removed from the aircraft the leg elements, free from attachment to the aircraft, are sufficiently loose with respect to the supported clips that they would readily be folded into an "I-shaped" component for storage.

If reference is now made also to FIG. 2 at this point, the universal character of the locking mechanism will be appreciated. It will be noted that the rudder structure schematically represented in FIG. 1 extends so that its lowermost point 49 is the rear of the rudder but the upper portion slopes to the forward portion of the airplane. Contrasted with this, the rudder structure of the aircraft depicted by FIG. 2 is so designed that its lowermost point 51 is substantially at the rearmost point of the fuselage and in the plane of the trailing edge of the elevators. The uppermost point of this rudder structure extends rearwardly of the fuselage with the rudder being adapted to be pivoted relative to the vertical stabilizer.

The structural formation of the leg elements and the fastening clamps here described are usable with each aircraft type. The locking components thus are laterally adjustable along the rear elevator surfaces to accommodate the different elevator configurations. The spring clamp elements 19 secured by each of the curved ends 15 and 16 and at the junction of the flattened ends 13 and 14 each may swivel independently of the other. This permits ready attachment to the tail or control surfaces.

The curvature of the curved ends 15 and 16 and the selectable apertures thereon to which the clip may be attached offers a wide initial selection of which the match may be made between the particular pitch of the rudder and the elevator structure. Showings of FIGS. 2 and 3 emphasize that for the swept-back rudder the curved flattened portion of each leg joins to the rear of the airplane. For a different type of pitch a different sloping as designated by FIG. 1 is utilized, making the component adaptable to a wide range of empennage configurations.

Each of the leg elements, as above described, has flattened ends with one end being curved according to the selected curvature. In many instances, the flattened portions of the leg elements may extend from a position corresponding to that of the axis. However, in some instances, as shown particularly by FIG. 4, it is desirable that the leg elements be so flattened that the uncurved portions are flattened on opposite sides and extend generally parallel to each other and substantially directly in line with the edge of the leg element. So arranged, the flattened straight portions extend in such a direction as to be in substantially abutting relationship if the leg elements are positioned adjacent to each other. In the showing of FIG. 4, the flattened ends 13' and 14' of the leg elements 11' and 12' are positioned so as to extend parallel to each other. When the leg elements are placed adjacent to each other in assembly with a clamp element the construction makes it unnecessary to include the spacer normally positioned between them to hold the clamp. Thus, the extended flattened portions are directly in line with one edge of the leg elements.

The curved flat portion of both legs curve in the same direction as is shown by FIG. 4. Accordingly, the uncurved flattened portion of the two legs 11' and 12' are on opposite sides. So arranged, the clamp may be assembled directly adjacent to each flattened end of the legs.

The leg element or component has been described above in generic terms. For reasons of lightness in weight, and yet because of strength considerations, it is usually formed from tubular aluminum elements, although this is not essential to the invention. Solid strong light-weight elements of various cross-sectional form may be used with equal facility. Further, while a tubular element is normally circular in cross-section, this likewise is not a limitation and, where desired, any chosen cross-sectional shape, such as circular, elliptical, rectangular, hexagonal, octagonal or the like may be used. In addition, the leg may be channel shaped, "I-beam" shaped or "V-shaped" with generally equal facility. The significant factor is that the leg element structures shall be so formed that the ends may be secured to the spring clamps adapted for gripping the trailing edge of the vertical rudder and the trailing edge of the elevator or horizontal rudder.

From the standpoint of curvature of one end of the leg elements, various arcuate curvatures may be chosen.

The radius of curvature may be varied within reasonable limits. In practice, it is generally preferable to use an arc curvature which has a fixed radius which may be defined by the equation $K=1/R$, where K represents the curvature and R the radius of curvature.

Considering this in generalized terms in a Cartesian coordinate system, the curvature may be expressed as follows:

$$K = \frac{\frac{d^2y}{dx^2}}{\left[1+\left(\frac{dy}{dx}\right)^2\right]^{3/2}} = \frac{1}{R}$$

or $$K = \frac{y''}{(1+y'^2)^{3/2}} = \frac{R}{1}$$

In the foregoing equations, K also represents the curvature and R is the radius of curvature. The letters $y'$ and $y''$ represent the first and second derivatives of the quantity $y=f(x)$, representing the curve in the rectangular or Cartesian coordinates.

Experience has shown that excessively long curvature or excessively short curvature is unsatisfactory. The optimum curvature for the majority of uses is generally approximately 31° with a radius of curvature of about 4⅜". This provides a curvature of the curved section of the leg elements which will accommodate the plane empennage design encompassing a forward rudder sweep and a back sweep even more severe than is now customary. As limiting values, it has been found that the radius of curvature generally should not be less than approximately 1¾" with the curvature extending through an arc in the range between 60° and 20°. With a longer radius of curvature running to approximately 6", the arc preferably is in the range from about 50° to 10°.

While the structure in its preferred form comprises two leg elements having one end of each leg connected to and supporting a spring clamp element which grips the trailing edge of the vertical rudder and forms the supporting legs into generally V formation, the described invention is nonetheless usable, particularly in conditions where only low velocity winds are experienced, with only one leg element. In such a case, one end of the leg element is attached to the spring clamp for fastening the rudder. The other end of the leg is attached to the spring clamp for securing the trailing edge of the elevator or horizontal rudder. In the case of the use of a single leg element for securing the rudder, it is particularly important that the elongated spring element be fastened to an intermediate point on the leg and secured also to the aircraft empennage at some suitable point. So attached, the tension is maintained upon the spring clamps at all times and, barring excessive wind forces, the rudder is generally securely fastened. This form of structure is not recommended as optimum for high wind velocities or for landing fields where the aircraft is subjected to high velocity propeller or jet air blasts, but, in many instances, has proven adequate. The use of a single leg element to secure the spring clamps thus provides a choice of whether or not the left or the right elevator or horizontal rudder has its trailing edge secured.

The length of the leg element is generally not a limiting factor. However, it has been found that lengths between 18" and 50" are generally most satisfactory. The length is so chosen that there may be adequate spacing between the gripped areas to provide maximum protection to the aircraft structure.

As indicated particularly by the FIGS. 1 and 2 showings for the forward sweep and backward sweep rudders, respectively, the leg members to which the clamping members for the elevators are attached are positioned so that the curved end of the leg elements face inwardly in the case of the forward sweep rudder (as for FIG. 1) and outwardly in connection with the backward sweep (as in FIG. 2). The particular form of airplane with which the locking device is to be used will usually determine which direction the leg elements are faced and which of the mounting holes is selected for fastening the clamps thereto. As indicated by the showing of FIG. 3, suitable washers and locking nuts are provided for securing preferred spacings and aiding in making the assembly of the various components prior to attachment to the aircraft. In the assembly, it is frequently desirable to fasten the streamer to at least one of the fastening bolts used to attach the spring clamp assembly to the curved end of the leg so that use of the attachment may not be overlooked prior to aircraft movement.

It is possible in some instances to achieve the general effects of smooth curvature by bending the leg element in a series of segmented straight lines to approximate the curve. Such bending could approximate a curve by a series of straight lengths making either the same or different angles to each other.

Various other modifications are within the scope of the invention and it should be understood that the claims are intended to be read broadly enough to cover fully such departures from the specific form of illustration and present description as clearly within the scope of what is set forth.

Having now described the invention, what is claimed is:

1. A rudder lock structure for aircraft comprising, in combination, a pair of elongated leg elements, each of said leg elements having flattened ends, one of the flattened ends of each leg being curved away from the leg axis, an apertured fastening region at each flattened end of the leg elements, a plurality of spring clamp elements, means to secure one of said spring clamp elements to the fastening region of the uncurved flattened ends of the pair of leg elements, the securement being adapted to hold the leg elements in V formation with the spring clamp element at the V apex, the spring clamp being adapted to be clamped to the trailing edge of the rudder element of an aircraft in a clamping position between its bottom and top, means for securing the remaining clamp members of the plurality individually to the flattened curved portion of the leg elements, the last named clamp members being adapted to be positioned to engage the trailing edge of the elevator elements of the aircraft at points thereon spaced laterally from the rudder with the curved flattened ends turned angularly relative to the connection or the straight ends to accommodate the elevator construction of the aircraft selected, an elongated expansible spring member, means to attach one end of said spring to one of the leg elements, and a fastening at the opposite end for securement at a point on the aircraft structure to tighten the assembly.

2. A rudder lock structure for aircraft comprising, in combination, a pair of leg elements, each of said leg elements having flattened ends and having one of the flattened ends curved away from the leg axis, an apertured fastening section at each flattened end of the leg elements, a plurality of spring clamp elements, means to secure one of said clamps to the uncurved flattened end of the leg members, the securement being adapted to hold the pair of leg elements in V formation with the spring clamp element at the V apex, the spring clamp being adapted to be clamped to the trailing edge of the rudder element of an aircraft at a clamping position between the bottom and top, and means for securing the remaining clamp members of the plurality individually to the flattened curved portion of the leg elements, the last-named clamp members being adapted to be positioned to engage the trailing edge of the elevator elements of the aircraft at points thereon spaced laterally from the rudder.

3. The rudder lock structure claimed in claim 2 comprising, in addition, an elongated expansible spring member, and means to attach one end of the said spring to one of the leg elements and the other end to a fastening point on the aircraft.

4. A rudder lock structure for aircraft comprising, in combination, a pair of tubular leg elements, each of said leg elements having flattened ends and having one of the flattened ends curved away from the tube axis, an apertured fastening section at each flattened end of the leg elements, a plurality of spring clamp elements, means to secure one of said clamps to the uncurved flattened ends of the pair of leg members, the securement being adapted to hold the leg elements in V formation with the spring clamp element at the V apex, the spring clamp being adapted to be clamped to the trailing edge of the aircraft rudder at a clamping position between its bottom and top, means for securing one of the remaining plurality of clamp members to the flattened curved end portion of each of the leg elements, each of the last-named clamp members being adapted to be positioned to engage and clamp the trailing edge of the elevator elements of the aircraft at points thereon spaced laterally from the rudder, an elongated expansible spring member, and means to attach one end of said spring to one of the leg elements and the other end to a fastening point on the aircraft to tighten the assembly.

5. The rudder lock structure claimed in claim 4 wherein each curved flattened end of the leg elements is curved in the same direction and the flattened straight ends are flattened on opposite sides of the tubular legs with one side of the flattened ends extending in line with the edge of the tubular element.

6. A rudder lock structure for aircraft comprising a pair of tubular leg elements of substantially like length, said leg elements having each end flattened, one flattened end of each leg element being curved away from the axis of the tubular element, each flattened end of each of the pair of tubular leg elements having a plurality of fastening openings progressively spaced between the flat end and the tubular leg, a spring-clamp, means for securing the spring clamp and the uncurved flattened legs with the legs positioned in substantially an inverted V form whereby the clamp is adapted to be removably secured to the trailing edge of the rudder of the aircraft, a spring-clamp means also adapted to be removably secured in one of the fastening openings of each curved flattened leg element and adapted to be secured to the trailing edge of the elevator element of said aircraft thereby to fix the relative positions of the rudder and elevator elements.

7. A rudder lock structure for aircraft comprising a pair of leg elements of substantially like length, said leg elements having each end flattened, one flattened end curved away from the axis of the element, each flattened end of each of the pair of leg elements having a plurality of fastening openings progressively spaced between the flat end and the leg, a spring-clamp, means for securing the spring-clamp and the uncurved flattened portion of the legs with the legs positioned in substantially an inverted V form whereby the clamp is adapted to be removably secured to the rudder of the aircraft, additional spring-clamp means also removably secured in the fastening openings of each curved flattened leg element and adapted to be secured to the trailing edge of the elevator element of said aircraft at positions spaced from the rudder by the leg elements, a spring element means to attach one end of the spring to one of the leg elements, and means to secure the second end of the spring to a selected anchor point on the aircraft whereby the clamps attached to the leg elements are adapted to be secured in the selected position and maintained tightly attached to the aircraft and whereby, with removal of one end of the spring element for attachment to the aircraft empennage, all of the spring, the leg elements, and the attached spring clips may be folded into substantially I formation for storage.

8. A rudder lock structure for aircraft comprising at least three spring clamp elements, means to removably secure one of the clamps to the trailing edge portion of an aircraft rudder at a point between its top and bottom, means to secure the other two said clamp elements to the trailing edge of the elevator elements of the aircraft on opposite sides of the rudder and at locations laterally spaced from the rudder, a plurality of tubular leg elements each having its ends flattened and apertured, one of the flattened ends of each leg extending substantially parallel to the axis of the said tubular leg, the second flattened end of each leg being curved from the axis of the tubular leg with the curvature extending for an arc of less than 60°, means to removably secure the uncurved flattened ends of the tubular members to the spring clamp fastened to the rudder element, means to secure the arcuately curved end of each leg to one of said laterally spaced clamps attached to the aircraft elevator means thereby to form the legs into a substantially open V formation, a spring element having means to secure one end to one of the leg elements at a selected point betwen the flattened ends, means to secure the second end of the spring to the aircraft body at a point removed from the clamped edge of the rudder thereby to tension the assembly to hold the rudder substantially fixed relative to the elevator, the said fastening means for securing the clips and the leg members and the spring means for securement to the aircraft being adapted to be loosened with disengagement of the spring end secured to the aircraft so that components may be folded to substantially I formation for storage.

9. A rudder lock structure for aircraft comprising at least three spring clamp elements, means to removably secure one of the clamps to the trailing edge portion of an aircraft rudder at a point between its top and bottom, means to secure the other two said clamp elements to the trailing edge of the elevator elements of the aircraft on opposite sides of the rudder and at locations laterally spaced from the rudder, a plurality of elongated tubular leg elements each having end portions flattened and apertured, one of the flattened ends of each leg having one edge extending substantially parallel to the periphery of the said tubular leg, the second flattened end of each leg being curved from the axis of the tubular leg extending for an arc of the order of 30° at a selected radius of curvature, one of the curved ends extending in a different direction than the other, means to removably secure the uncurved flattened ends of the tubular members to the spring clamp fastened to the rudder, means to secure the arcuately curved end of each leg to one of said laterally spaced clamps attached to the aircraft elevator means thereby to form the legs into a substantially open V formation, a spring element having means to secure one end to one of the leg elements at a selected point between the flattened ends, and means to secure the second end of the spring to the aircraft body at a point removed from the clamped edge of the rudder thereby to tension the assembly to hold the rudder substantially fixed relative to the elevator.

10. A rudder lock structure for aircraft comprising, in combination, a plurality of spring cushioned clamp elements, means for fastening one of the clamp elements to the trailing edge of the vertical rudder of the aircraft, means for fastening a second of the spring cushioned clamp elements to the trailing edge of the horizontal rudder of the aircraft, a connecting leg connecting the spring cushioned clamp elements, and means to fasten the spring cushioned clamp elements substantially at the ends of the leg element, said leg element having one end thereof curved according to a curvature pattern generally designated $K=1/R$ where K represents the arcuate curvature and R represents the radius of curvature, and resilient means adapted to be connected at one end to the leg element at a point between the secured spring cushioned clamp elements, said resilient means also being adapted to connect at the opposite end to a fixed point on the aircraft structure, thereby to create a force on the leg element tending to hold the spring cushioned clamp elements to the rudder and elevator elements.

11. A rudder lock structure for aircraft comprising a pair of elongated leg elements of substantially like length, a plurality of spring clamp elements adapted for connecting to the trailing edge of an aircraft vertical rudder and also to connect to the trailing edge of the elevator elements of the aircraft structure, means for securing one end of each of the leg elements and the spring clamp element attached to the vertical rudder thereby to form the leg elements into substantially V-formation and to provide a fastening means for the said spring clamp element, the ends of the leg elements removed from the apex of the V-formation elements being curved according to a pattern $K=1/R$; where K represents the arcuate curvature and R represents the radius along which the curvature is established.

12. The structure claimed in claim 11 wherein the radius of curvature of the curved end of the leg elements is in the range between 1¾" and 6" wherein the arc is in the range between 10° and 60°.

13. The aircraft locking structure as claimed in claim 11 wherein the radius of curvature is in the range between 4" and 4½" and the arc is in the range between 28° and 34°

14. The aircraft locking structure claimed in claim 11 wherein the curvature is represented by a factor $$K=\frac{y''}{(1+y'^2)^{3/2}}=\frac{1}{R}$$

where K represents the curvature, R represents the radius of curvature and $x'$ and $y'$ represent the first and second derivatives of the quantity $y=f(x)$ as representing the curve in rectangular or Cartesian coordinates.

No references cited.

MILTON BUCHLER, *Primary Examiner.*

A. H. FARRELL, *Assistant Examiner.*

UNITED STATES PATENT OFFICE
CERTIFICATE OF CORRECTION

Patent No. 3,288,401                    November 29, 1966

Charles Fete

It is hereby certified that error appears in the above numbered patent requiring correction and that the said Letters Patent should read as corrected below.

Column 5, lines 15 and 16, for that portion of the formula reading $$=\frac{R}{1} \quad \text{read} \quad =\frac{1}{R}$$

Signed and sealed this 5th day of September 1967.

(SEAL)
Attest:

ERNEST W. SWIDER                    EDWARD J. BRENNER
Attesting Officer                         Commissioner of Patents